United States Patent
Beudeker et al.

(12)

(10) Patent No.: US 6,638,561 B1
(45) Date of Patent: Oct. 28, 2003

(54) MICROBIAL ARACHIDONIC ACID (ARA) FOR USE IN MARINE FEED

(75) Inventors: Robert Franciscus Beudeker, Den Hoorn (NL); Peter Coutteau, Baasrode (BE)

(73) Assignee: DSM N.V. (NL)

(*) Notice: Subject to any disclaimer, the term of this patent is extended or adjusted under 35 U.S.C. 154(b) by 0 days.

(21) Appl. No.: 09/719,711

(22) PCT Filed: Jun. 17, 1999

(86) PCT No.: PCT/EP99/04224

§ 371 (c)(1),
(2), (4) Date: Mar. 19, 2001

(87) PCT Pub. No.: WO99/65327

PCT Pub. Date: Dec. 23, 1999

(30) Foreign Application Priority Data

Jun. 17, 1998 (EP) .......... 980304802

(51) Int. Cl.[7] .................................. A23K 1/18
(52) U.S. Cl. ........................ 426/643; 426/805
(58) Field of Search ................. 426/643, 805

(56) References Cited

U.S. PATENT DOCUMENTS 6,261,590 B1 * 7/2001 Place et al. .......... 424/442

FOREIGN PATENT DOCUMENTS

| EP | 0 726 321 A | 8/1996 | |
|---|---|---|---|
| JP | 11 098965 A | 4/1999 | |
| WO | WO 90/07283 | 1/1990 | |
| WO | WO 91/07498 A1 | 5/1991 | ............. C12P/7/64 |
| WO | WO 97/36996 A | 10/1997 | |
| WO | WO 97/37032 A2 | 10/1997 | ............. C12P/7/64 |
| WO | WO 98/08967 A | 3/1998 | |

OTHER PUBLICATIONS

Estevez et al. Aquaculture Nutrition, vol. 3(3), pp. 201–216, 1997.*
Izquierdo, Aquaculture Nutrition, vol. 2(4), pp. 183–191, 1996.*
W. Barclay et al., Journal of the World Aquaculture Society, vol. 27, No. 3, 1996, pp. 314–322.
G. E. Napolitano et al., Journal of the World Aquaculture Society, vol. 21, No. 2, 1990, pp. 122–130.
Patent Abstracts of Japan, vol. 199, No. 909, Jul. 30, 1999.
G. Mieth et al., Die Nahrung., vol. 36, No. 1, 1992, pp. 90–92.
J. R. Sargent et al., Aquaculture 155, 1997, pp. 117–127.
Lepage and Roy, J. Lip. Res., 25, 1984, pp. 1391–1396.
J. F. Rees et al., Aquaculture 122, 1994, pp. 193–207.
J. A. Clawson et al., Aquaculture 108, 1992, pp. 125–134.

* cited by examiner

Primary Examiner—Chhaya D. Sayala
(74) Attorney, Agent, or Firm—Morrison & Foerster LLP

(57) ABSTRACT

A marine feed composition is described comprising microbially derived arachidonic acid (ARA) or ARA in the form of a triglyceride. The ARA is suitably produced by a fungus, such as of the genus Mortierella, although the feed composition itself is free of microbial cells. These forms of ARA have been found to give better growth and pigmentation promotion in marine organisms (shrimps and fish) than corresponding phospholipid forms of ARA from fish oil. The ARA can be in the form of an oil, e.g. an oil-in-water emulsion or may first be fed to larvae, rotifers or nauplii which are themselves included in a composition as "live" feed for larger organisms.

46 Claims, No Drawings

MICROBIAL ARACHIDONIC ACID (ARA) FOR USE IN MARINE FEED

CROSS-REFERENCE TO RELATED APPLICATIONS

This application is the national phase of PCT application PCT/EP99/04224 having an international filing date of Jun. 17, 1999, and claims priority from European application (EPO) 980304802.6 filed Jun. 17, 1998. The contents of these documents are incorporated herein by reference.

FIELD OF THE INVENTION

The present invention relates to the use of microbially derived arachidonic acid (ARA) for use in marine feed compositions, for feeding aquatic (e.g. marine) animals and for use in aquaculture. The ARA can be derived from a single cell organism, and thus may be in the form of a triglyceride.

BACKGROUND OF THE INVENTION

Arachidonic acid (ARA) is one of a number of Long Chain Poly-Unsaturated Fatty Acids (LC-PUFA's). Chemically it is cis-5,8,11,14 eicosatetraenoic acid (20:4) and belongs to the (n-6) family of LC-PUFA's.

Arachidonic acid is a major precursor (in fish as well as in higher terrestrial vertebrates) of a wide variety of biologically active compounds, known collectively as eicosanoids, a group comprising prostaglandins, thromboxanes and leukotrienes. Marine fish, shrimp and various terrestrial animals, such as cats, lack Δ-5 desaturase activity and so are not able to convert the fatty acid 18:2(n-6) (inoleic acid) to ARA. Since arachidonic acid is essential to produce eicosanoids, it is an essential fatty acid for these animals and so must be provided in their diets.

The ratio of eicosapentaenoic acid (EPA) {20:5(n-3)} to docosahexaenoic acid DHA) {22:6(n-3)} to arachidonic acid {20:4(n-6)} in the diets of these animals can be important since a relative excess of EPA can prevent the production of eicosanoids from arachidonic acid.

Normal diets for marine fish and shrimp contain variable amounts of arachidonic acid of fish oil origin. The content of arachidonic acid in known fish oils is variable but usually relatively low, about 1% of total fatty acids present (Sargent, J. R., McEvoy, L. A. and Bell, J. G.: Aquaculture 155 (1997) p.117–127).

The ability to grow marine fish larvae is often determined to a large extent by the nutritional composition of the diet. It is difficult to obtain desirable ratios of eicosapentaenoic acid, docosahexaenoic acid and arachidonic acid using available raw materials such as fish oil, animal offal and the like since the LC-PUFA levels are highly variable even similar sources and a substantial part of arachidonic acid present is destroyed in the process of sterilising these raw materials.

One of the aims of the invention is to provide a source of arachidonic acid, of reproducible quality, to enable the aquaculture feed industry to find a satisfactory level of arachidonic acid in the diet (e.g. live feeds) for fish larvae and shrimp as well as the right ratio of arachidonic acid, eicosapentaenoic acid and docosahexanoic acid for these animals. Nearly all marine culture (mariculture) production systems rely on live feeds, principally the rotifer *Brachionus plicatilis* and nauplii of the brine shrimp Artemia, although alternative live feeds do exist.

Enrichment of live feed with eicosapentaenoic acid and docosahexaenoic acid from fish oil emulsions have been described (Sargent et al, supra). They also describe the possibility of using freeze-dried or spray-dried cells of algae and fungi containing high amounts of docosahexaenoic acid for the enrichment of live feeds.

Sargent et al also suggests arachidonic acid, but in the form of a phospholipid. Phospholipids of arachidonic acid are a natural source for flatfish and shrimp in their live feeds as this is the form that is present in fish oil. The phospholipid form of arachidonic acid is less susceptible to oxidation (in comparison with free arachidonic acid) and so is preferred by the aquaculture industry.

WO-A-90/07283 (Suntory) refers to feeds for fish and shellfish containing fungal cells which contain n-3 fatty acids (e.g. EPA, DHA) or esters thereof. However, again these sources are often low in ARA and furthermore the ARA is often present as a phospholipid.

It has been found however that by using microbially derived ARA a much higher content of ARA is achievable inside the marine animal. A marked increase in enrichment in ARA has been found in marine animals fed with feeds that contain ARA derived from single cell organisms.

DESCRIPTION OF THE INVENTION

Thus, according to a first aspect of the present invention there is provided a marine feed composition comprising one or more (marine) feed component(s) and/or ingredient(s) and microbially derived arachidonic acid (ARA). The ARA can thus be derived from a single cell organism, such as a microorganism, which it will be appreciated excludes fish oil (or marine) sources. Microbially derived ARA is usually in triglyceride form and so the invention also relates to a marine feed composition comprising ARA in the form of a triglyceride.

Preferably the feed will be (substantially) free of ARA in the form of phospholipids. The invention thus may avoid the use of phospholipid ARA, which is the form that ARA occurs in marine sources (e.g. fish oil). To thus feed marine animals with a form of ARA different from the natural source, in other words a form that would not normally be ingested by the organism, seems counter-intuitive. Nevertheless, the Applicant has found that this can lead to unexpected benefits.

The ARA will usually be present as or in an oil. Thus, this oil may be derived from or produced by a single cell organism, such as from a microbial source. The oil may have at least 10%, such as at least 20%, preferably at least 30%, advantageously at least 35% and optimally at least 40% ARA (based on the total weight of fatty acids). The oil may have an ARA content of at least 250, preferably at least 300, optimally at least 350 g/kg oil. The oil suitably has a minimum triglyceride content of 90%, eg. at least 95%, optimally at least 97%. Of the ARA present, preferably at least 85%, such as at least 90%, and optimally at least 95% is in the form of triglycerides.

Preferably the ARA is not still inside cells, for example the microbial cells that had produced the ARA. Thus, the marine feed of the invention can be (substantially) free of single cell organisms or microbes such as from which the ARA is derived or produced by. This can not only make the feed composition easier to formulate but, surprisingly, the ARA is found to be more stable once extracted from the cells that produced the ARA.

Although ARA has been suggested for use in marine feeds, the tendency has been to use ARA in a phospholipid form, usually from a marine source. This is not only because the phospholipid form is the naturally occurring form for marine animals but also since it is less susceptible to oxidation. However, despite this prejudice, the applicant has found that microbially derived ARA (or ARA in the form of a triglyceride) can provide advantages over phospholipid forms of ARA. In particular there can be a higher uptake and use of the ARA by the marine organism to which the feed composition of the invention is fed. Furthermore, with high quality microbial ARA the oxidation problem can be overcome or at least mitigated.

A further advantage of microbial ARA is that the oil can have a higher ARA content than, say, fish oil, which means less microbial oil can be used to deliver the same quantity of ARA (resulting in cheaper transport, storage and feed costs). The microbial (or single cell) source from which the ARA is derived or produced by is suitably a microorganism, for example one in a filamentous form, such as a fungus or an algae. Preferred fungi are of the order Mucorales. For example, the fungus may be of the genus Mortierella, Phycomyces, Blakeslea or Aspergillus. Preferred fungi are of the species *Mortierella alpina, Blakeslea trispora* and *Aspergillus terreus*.

Preferred algae are dinoflagellates and/or belong to the genus Crypthecodinium. Preferred algae are of the species *Crypthecodinium cohnii*.

These ARA sources produce predictable quantities of ARA, unlike marine sources whose PUFA content can vary according to species and the processing techniques used.

The ARA is preferably derived from or produced by the microbial (or single cell) source by fermentation. The microbes may be grown in (large scale) fermentors. Fermentation can occur when the microorganisms are present in an aqueous composition comprising an assimilable carbon source (for example, glucose or maltodextrin) and a suitable nitrogen source (for example, ammonium ions, such as from ammonium sulphate or yeast extract).

During or after fermentation one obtains a fermentation "broth" which comprises the microorganisms and a medium, e.g. an aqueous solution. These can then be separated (eg. by filtration, centrifugation or other solid-liquid separation technique) to give the aqueous solution (eg. in the form of a filtrate) and the microorganisms (referred to as a biomass). The ARA (and other PUFAs, if necessary) can then be extracted and/or isolated from the biomass. This can be achieved using a solvent, for example, an apolar solvent or any other suitable solvent that is capable of dissolving ARA. In particular, this can be a $C_{3-8}$ alkane, such as hexane.

Before the ARA is extracted, the biomass can be subjected to mechanical, chemical and/or physical processing. For example, the biomass may be heated and/or pasteurised. The biomass may be processed into a granulate form, for example by extrusion.

The ARA, as explained earlier, is preferably present in the marine feed as an oil. This oil may be present as an emulsion. Thus, the ARA may be provided as an oil in a oil-in-water emulsion. The emulsion preferably contains an emulsifier, and may additionally contain an antioxidant. Lecithin may fulfill both functions.

The compositions of the invention may be used as feeds for aquatic animals and, generally, in aquaculture. Suitable marine organisms to which the composition can be fed are salt or seawater organisms. Suitably the organisms are coldwater organisms.

The marine organism to be fed the composition may be larvae (e.g. of the subPhylum Crustacea), rotifers (such as of the Phylum Rotifera) or nauplii (e.g. larvae of Artemia). Preferred rotifers are of the species *Brachonius plicatilis*. All these organisms are relatively small and so may themselves be present in the marine feed for digestion by larger organisms. In this case these organisms are one of the feed components or ingredients and so constitute a "live" feed. In this case the ARA may be already inside these organisms or it may be present elsewhere in the composition.

Other suitable marine organisms that may be fed the compositions of the invention include the copepods (for example of the class Copepoda), for example of the class Tisbe, Acartia, Artemia and/or Eurytemora.

Marine organisms specifically contemplated belong to the Phylum Molltisca, for example of the class Bivalvia, subclass Protobranchia and Lamellibranchia (which includes Mytilus and Ostrea, mussels and oysters). Also included are organisms of the class Cephalopoda, such as subclass Coleoida, for example Decapoda, Sepia, Loligo (including squids and cuttlefish) and Octopoda (octopus).

Other organisms are of the subPhylum Crustacea, such as division Astacus, which includes crayfish, and order Amphipoda, such as division Gammarus, which includes prawns and shrimps.

The marine organisms can therefore include nonvertebrates such as octopus and squid, prawns (Leander) and shrimps (Crangon). Also included are fish, or other vertebrate organisms, such as herring, turbot (e.g. *Scophthalmus maximus*), halibut, salmon (Atlantic, Chinook, Coho, Pacific), trout (such as Rainbow trout, Oncorhynchus mykiss), bream (such as sea bream, *Sparus aurata*), sole (such as common sole, *Solea solea* L, Senegal sole, *Solea senegalensis* Kaus), bass (such as sea bass, *Dicentrarchus labra*), flounder (Parlichtys, such as Japanese flounder, *Parlichtys divaceus*), Yellow tail, Milkfish and Arctic Charr.

Also included are shellfish such as lobster, mussels, oysters, clams, prawns (Macrobrachium, such as rosenbergii), shrimps (Penaeus, such as japonicus, Kurum shrimp and vannamei, white leg shrimp, monodon and setiferus).

Preferred shrimps are those of the class Artemia. In particular, nauplii of Artemia can be fed or included in the compositions of the invention as a "live" feed.

Live feeds, where an edible marine organism is provided in the food for consumption by a larger organism, are particularly suitable for young organisms or those at an early stage of development, e.g. larvae, for example up to 3 days, such as up to 5 days or even up to 10 days old. This is because such organisms may not be able to assimilate prepared diets effectively. The inclusion of live organisms in the feed will usually be in addition to various or standard feed components and/or ingredients. Live nauplii, e.g. of brine shrimp or Artemia are particularly suitable for larvae.

Other components or ingredients may include, for example, fish meal, soya meal, wheat meal binders and/or stabilizers, and if necessary minerals and/or vitamins. The feed may be in the form of pellets and/or granules. Larvae (e.g. of fish and crustaceans) may initially be fed on live feeds, and later on in development non-live feeds.

To give some guidance on the amounts of various materials that can be included, these may be as follows:
 fish meal 30 to 60%, e.g. 40 to 50%;
 enzymatically digested fish meal (concentrate) 1 to 15%, e.g. 5 to 10%;
 soya and/or wheat meal 5 to 25%, e.g. 10 to 18% (each)
 minerals and/or vitamins 0.5 to 4%, such as 1 to 2% (each).

For many marine organisms, in particular fish, the diet can contain 10 to 40% lipids. It may also contain from 35 to 50% protein. Suitably the amount of phosphorus available to the organism is less than 0.8%. This diet may contain natural or artificial carotenoids, vitamins and/or minerals.

It is preferred that the amount of ARA present in a (e.g. non-live) feed is from 0.1 to 5%, such as from 0.1 to 2%. Suitably the total n-6 PUFA content can be from 1 to 15% of the diet (by weight).

For a live feed the ARA content may be from 5 to 30%, for example 10 to 25%, optimally from 15 to 20%. The total content of n-6 PUFAs may then be from 5 to 50%, e.g. 5 to 30%. Here the ARA may be inside (having already been consumed by) the live edible marine organisms.

If necessary, the marine feed may contain other polyunsaturated fatty acids (PUFAs), for example a C18, C20 and/or C22 ω3 or ω6 PUFA. Other PUFAs contemplated include for example docosahexaenoic acid PHA) (from algae or fungi, such as the algae Crypthecodinium or the fungus Thraustochytrium), gamma-linolenic acid (GLA), and/or EPA. Any of these PUFAs may be provided individually or may be present in the oil in which the ARA is contained.

If EPA is provided in addition to ARA, then the ratio of EPA:ARA can be from 1:0.5 to 1:2, such as from 1:1 to 1:1.6. If DHA is present, then the DHA:ARA ratio may be from 1:0.2 to 1:1, such as from 1:0.25 to 1:0.7. When both EPA and DHA are present then the DHA:EPA:ARA ratio may vary from 3–5:0.5–2.0:1.0–2.0 (e.g. if the feed is not "live") or from 1.0–2.0:0.7–1.3:0.7–1.3 for a "live" feed.

A second aspect of the present invention relates to a process for the preparation of a marine feed composition, the process comprising mixing microbially derived ARA, or ARA in the form of a triglyceride, with one or more marine feed component(s) and/or ingredient(s). These may include fish meal and materials of vegetable origin and have been described in detail earlier.

The feed compositions may, for example, be "live" compositions containing live multicellular marine organisms, for example larvae, nauplii or rotifers as previously described.

This aspect of the invention therefore includes the supplementation of an existing marine feed composition with the ARA.

A third aspect of the present invention relates to the use of microbially derived ARA, or ARA in the form of a triglyceride (or marine feed compositions comprising either of these forms of ARA) for use in promoting the growth and/or pigmentation in a marine organism. This use may also extend to the supplementation of a marine diet, for example as a nutritional supplement. The use also contemplates the assistance of the marine organism in producing eicosanoids.

A fourth aspect of the present invention relates to a process of feeding a marine organism with a marine feed composition of the first aspect.

A fifth aspect of the invention relates to a process for promoting growth and/or pigmentation in a marine organism, the process comprising feeding the organism with a marine feed composition of the first aspect.

Preferred features and characteristics of one aspect of the present invention are suitable for another aspect mutatis mutandis.

The invention will now be described, by way of example, with reference to the following Examples, which are provided for illustration, and are not to be construed as being limiting.

COMPARATIVE EXAMPLES 1 and 2 and EXAMPLE 3

Enrichment of Artemia Feed With Microbial Arachidonic Acid (ARA)

Crude arachidonic acid (ARA) oil was produced by the fungus *Mortierella alpina* using the protocol of Example 1 of the International Application No. PCT/EP97/01446 (WO-A-97/36996). This oil is available from Gist-brocades B.V. under the trade mark VEVODAR™. The oil was then ready for formulation of arachidonic acid rich emulsions using lecithin (to give a final concentration of lecithin of 10%).

An emulsion of the ARA oil was formulated to give a ratio of docosahexaenoic acid DHA), eicosapentaenoic acid EPA) and arachidonic acid (ARA) of 4/1/1.5 (Example 3) while another emulsion (Comparative Example 2) was formulated to a DHA:EPA:ARA ratio of 2.5/1/0.2 by using fish oil instead of the microbial ARA oil. The two emulsions were then tested for stability by centrifuging the emulsions for 15 minutes at 3000 rpm. Both emulsions were stable in this centrifuge test, meaning that no separation into different layers was observed.

Artemia cysts were hatched in seawater at a temperature of 28° C. After 24 hours from hatching, the nauplii were harvested and transferred to an enrichment tank at a density of 250 nauplii/ml.

The two emulsions were then used (each in duplicate) to supplement a standard nauplii diet:

a) enrichment with 300 ppm microbial arachidonic acid (ARA) emulsion (Example 3); and b) enrichment with 300 ppm fish oil emulsion (Comparative Example 2).

After subsequent enrichment, samples of the nauplii were taken to perform fatty acid analysis using the FAME (fatty acid methyl esters)methodology as described by Lepage and Roy, J.Lip.Res. 25:1391–6 (1984) to determine their PUFA content. As a control some nauplii were grown using a standard feed without either emulsion (no ARA, Comparative Example 1).

The levels of docosahexaenoic acid, eicosapentaenoic acid and arachidonic acid in enriched nauplii and control nauplii are shown in Table 1.

TABLE 1

Levels of docosahexaenoic acid, eicosapentaenoic acid, arachidonic acid and the sum of all (n-3) and (n-6) fatty acids in *Artemia nauplii* (after enrichment).

| Enrichment Protocol (Example) | Docosahexaenoic acid (DHA, n-3) content (mg/g dry weight) | Eicopentaenoic acid (EPA, n-3) content (mg/g dry weight) | Arachidonic acid (ARA, n-6) content (mg/g dry weight) | Sum (n-3) + (n-6) fatty acids (mg/g dry weight) |
|---|---|---|---|---|
| 1. Control (none) | 0.1 | 7.9 | 1.6 | 20.7 |
| 2. Fish oil emulsion | 28.3 | 23.5 | 4.6 | 84.6 |
| 3. Microbial ARA emulsion | 24 | 15.6 | 16.1 | 83.3 |

The results show that arachidonic acid oil made by *Mortierella alpina* can be used to enrich Artemia feed. This resulted in an altered ratio of docosahexaenoic acid, eicosapentaenoic acid and arachidonic acid in the fed nauplii. The ratio of fatty acids provided by the microbial oil was more suitable to increasing growth and pigmentation in aquatic species by significantly increasing the ARA content in the organisms. These ARA-enriched nauplii can be used themselves as live feed ingredients in feed compositions for larger marine animals.

The same procedure was repeated except using rotifers (*Brachionus plicatilis*) instead of Artemia nauplii.

COMPARATIVE EXAMPLES 4 and 5 and EXAMPLE 6

Effect of ARA Enriched Diet on Growth Parameters of Tiger Shrimp

Four day old Penaeus monodon (giant tiger shrimp) postlarvae were obtained from a commercial source and were grown in tanks containing disinfected seawater at a density of 20 postlarvae/l at a temperature of 28° C. ARA enriched Artemia nauplii and control nauplii (from Examples 2 and 3) were fed ad libitum to the tanks 4 times a day (as described by Rees, J. F., Cure, K., Piyatiratitivorakul, Sorgeloos, P and Menasveta, P in Aquaculture 122 (1994) 193–207) for 10 days.

The increase in total mass of the larvae was taken as the indicator for growth. The dry weight (of total biomass) was measured at the beginning and the end of the experiment and the increase in weight is shown in Table 2.

TABLE 2

Growth of monodon postlarvae fed *Artemia nauplii* enriched with ARA from a microbial source in comparison with non-enriched nauplii and nauplii enriched with fish oil (nauplii prepared according to Examples 2 and 3).

| Example | Enrichment protocol | Increase in Shrimp dry weight (mg) |
| --- | --- | --- |
| 4 | Control (none) | 30 |
| 5 | Fish oil emulsion (Ex. 2) | 92 |
| 6 | Microbial ARA emulsion (Ex. 3) | 135 |

The results clearly show the favourable effects of microbial ARA enriched Artemia nauplii on the growth of the larvae.

At the end of the experiment the then 15 day-old postlarvae were subsequently lyophilized. The fatty acid composition of the larvae was analysed using the standard technique described in the previous Example. Results are expressed as mg FAME (fatty acids methyl esters)/g dry weight of shrimp.

TABLE 3

Fatty acid composition of tiger shrimp postlarvae fed Artemia enriched with microbial ARA in comparison with nauplii enriched with a fish oil emulsion and a negative control (i.e. nauplii not enriched with PUFA's).

| Fatty acid | Comparative Example 4 Negative control | Comparative Example 5 Fish oil | Example 6 microbial-ARA oil |
| --- | --- | --- | --- |
| ARA | 2.8 | 3.4 | 9.7 |
| DHA | 0.4 | 8.5 | 8.3 |
| EPA | 3.1 | 9.7 | 9.5 |

The results demonstrate the marked increase in ARA content in postlarvae using a mycrobial source of ARA.

COMPARATIVE EXAMPLES 7 and 8 and EXAMPLE 9

Effect of ARA Enriched Diet on Growth of White Bass Larvae

A similar experiment to that described in Examples 4 to 6 was repeated except using larvae of white bass. The methodology used was described in detail by J. A. Clawson and T. T. Lovell in Aquaculture 108 (1992): 125–134. The results obtained show that feeding white bass larvae with Artemia nauplii enriched in microbial ARA improved growth in comparison with control Artemia nauplii enriched with fish oil.

What is claimed is:

1. A marine feed composition comprising one or more feed component(s) and/or ingredient(s) and microbially derived arachidonic acid (ARA) and the composition is substantially free of microorganisms that produce, or are capable of producing, ARA.

2. A composition according to claim 1 which is substantially free of microorganisms that produced, or are capable of producing, ARA.

3. A composition according to claim 1 wherein the ARA is produced by or derived from a fungus or an algae.

4. A composition according to claim 3 wherein the fungus is of the order Mucorales.

5. A composition according to claim 3 wherein the fungus is of the genus Mortierella, Phycomyces, Blakeslea or Aspergillus.

6. A composition according to claim 3 wherein the fungus is the species *Mortierella alpina*.

7. A composition according to claim 1 wherein the ARA is present as an oil.

8. A composition according to claim 7 wherein the ARA content in the oil is at least 20%.

9. A composition according to claim 7 wherein the oil comprising ARA is formulated as an oil-in-water emulsion.

10. A composition according to claim 1 which is a "live" feed composition and comprises edible marine organisms.

11. A composition according to claim 10 wherein the edible marine organisms that are present as a live feed are larvae, rotifers or nauplii.

12. A composition according to claim 10 suitable for feeding to marine organisms that are larvae, rotifers or nauplii.

13. A composition according to claim 12 wherein the organisms are of the subPhylum Crustacia or Phylum Rotifera.

14. A composition according to claim 13 wherein the ARA is present in the edible marine organisms in the live feed.

15. A composition according to claim 1 which additionally comprises a $C_{18}$, $C_{20}$ or $C_{22}$ -3 or -6 polyunsaturated fatty acid (PUFA).

16. A composition according to claim 15 wherein the PUFA comprises DHA, GLA and/or EPA.

17. A marine feed composition comprising one or more component(s) and/or ingredient(s) and ARA where the ARA is in the form of a triglyceride and/or the composition is substantially free of ARA in phospholipids form and the composition is substantially free of microorganisms that produce, or are capable of producing, ARA.

18. A composition according to claim 17 which is substantially free of microorganisms that produced, or are capable of producing, ARA.

19. A composition according to claim 17 wherein the ARA is produced by or derived from a fungus or an algae.

20. A composition according to claim 19 wherein the fungus is of the order Mucorales.

21. A composition according to claim 20 wherein the fungus is of the genus Mortierella, Phycamyces, Blakesiea or Aspergillus.

22. A composition according to claim 20 wherein the fungus is of the species *Mortierella alpina*.

23. A composition according to claim 17 wherein the ARA is present as an oil.

24. A composition according to claim 23 wherein the ARA content in the oil is at least 20%.

25. A composition according to claim 17 wherein the oil comprising ARA is formulated as an oil-in-water emulsion.

26. A composition according to claim 17 which is a "live" feed composition and comprises edible marine organisms.

27. A composition according to claim 26 wherein the edible marine organisms that are present as a live feed are larvae, rotifers or nauplii.

28. A composition according to claim 27 for feeding to larvae, rotifers or nauplii.

29. A composition according to claim 28 wherein the organisms are of the subPhylum Crustacea or Phylum Rotifera.

30. A composition according to claim 29 wherein the ARA is present in the edible marine organisms in the live feed.

31. A composition according to claim 17 which additionally comprises a $C_{18}$, $C_{20}$ or $C_{22}$ -3 or -6 polyunsaturated fatty acid (PUFA).

32. A composition according to claim 31 wherein the PUFA comprises DHA, GLA and/or EPA.

33. A process for preparing a marine feed composition, the process comprising mixing microbially derived arachidonic acid (ARA), but not an organism used to derive the ARA, with one or more feed component(s) and/or ingredient(s), such that the composition is substantially free of microorganisms that produced, or are capable of producing, ARA.

34. A process for preparing a marine feed composition, the process comprising mixing ARA in the form of a tryglyceride with one or more feed component(s) and/or ingredient(s).

35. A process for promoting growth of a marine organism, the process comprising feeding the organism a marine feed composition as defined in claim 1.

36. A process for promoting growth of a marine organism, the process comprising feeding the organism a marine feed composition as defined in claim 17.

37. A process according to claim 35 wherein the marine organism is selected from the group consisting of the class Copepoda or Cephalopoda, Phylum Mollusca, subPhylum Crustacea, Leander and Crangon.

38. A process according to claim 37 wherein the organism is selected from the group consisting of mussels, oysters, squid, cuttlefish, octopus, crayfish, prawns, shrimps, herrings, turbot, halibut, salmon, trout, bream, sole, bass, flounder, charr, lobsters or clams.

39. A process for promoting pigmentation of a marine organism, the process comprising feeding the organism a marine feed composition as defined in claim 1.

40. A process for promoting pigmentation of a marine organism, the process comprising feeding the organism a marine feed composition as defined in claim 17.

41. A process according to claim 39 wherein the marine organism is selected from the group consisting of the class Copepoda or Cephalopoda, Phylum Mollusca, subPhylum Crustacea, Leander and Crangon.

42. A process according to claim 41 wherein the organism is selected from the group consisting of mussels, oysters, squid, cuttlefish, octopus, crayfish, prawns, shrimps, herrings, turbot, halibut, salmon, trout, bream, sole, bass, flounder, charr, lobsters or clams.

43. A process of feeding a marine organism, the process comprising supplying the organism with a feed composition according to claim 1.

44. A process of feeding a marine organism, the process comprising supplying the organism with a feed composition according to claim 17.

45. A process according to claim 43 wherein the marine organism is selected from the group consisting of the class Copepoda or Cephalopoda, Phylum Mollusca, subPhylum Crustacea, Leander and Crangon.

46. A process according to claim 45 wherein the organism is selected from the group consisting of mussels, oysters, squid, cuttlefish, octopus, crayfish, prawns, shrimps, herrings, turbot, halibut, salmon, trout, bream, sole, bass, flounder, charr, lobsters or clams.

* * * * *